US012665479B2

(12) United States Patent
Hsu et al.

(10) Patent No.: US 12,665,479 B2
(45) Date of Patent: Jun. 23, 2026

(54) SYNCHRONOUS RELUCTANCE MOTOR

(71) Applicant: NIDEC CORPORATION, Kyoto (JP)

(72) Inventors: Yu-Wei Hsu, Taipei City (TW);
Sheng-Chan Yen, Taipei City (TW);
Guo-Jhih Yan, Taipei (TW);
Cheng-Tsung Liu, Kaohsiung (TW)

(73) Assignee: NIDEC CORPORATION, Kyoto (JP)

( * ) Notice: Subject to any disclaimer, the term of this
patent is extended or adjusted under 35
U.S.C. 154(b) by 197 days.

(21) Appl. No.: 18/597,793

(22) Filed: Mar. 6, 2024

(65) Prior Publication Data

US 2024/0305180 A1 Sep. 12, 2024

(30) Foreign Application Priority Data

Mar. 7, 2023 (CN) .......................... 202310213183.4

(51) Int. Cl.
*H02K 21/46* (2006.01)
(52) U.S. Cl.
CPC ......... *H02K 21/46* (2013.01); *H02K 2213/03*
(2013.01)
(58) Field of Classification Search
CPC .... H02K 21/46; H02K 2213/03; H02K 1/246;
H02K 1/2766; H02K 21/14
See application file for complete search history.

(56) References Cited

U.S. PATENT DOCUMENTS

| | | | |
|---|---|---|---|
| 4,922,152 A | 5/1990 | Gleghorn et al. | |
| 5,097,166 A | 3/1992 | Mikulic | |
| 9,705,388 B2 | 7/2017 | Melfi et al. | |
| 10,523,099 B2 | 12/2019 | Haussmann et al. | |
| 11,088,603 B2 | 8/2021 | Lee et al. | |
| 2014/0265704 A1 | 9/2014 | Rhyu et al. | |
| 2020/0052557 A1* | 2/2020 | Rubin ...................... | H02K 1/02 |
| 2022/0209595 A1* | 6/2022 | Shih ........................ | H02K 1/246 |
| 2022/0407372 A1* | 12/2022 | Yen ........................ | H02K 15/023 |

* cited by examiner

*Primary Examiner* — Tulsidas C Patel
*Assistant Examiner* — Mohammed Ahmed Qureshi
(74) *Attorney, Agent, or Firm* — JCIPRNET

(57) ABSTRACT

A synchronous reluctance motor includes a rotor having a
rotor iron core and a stator having pole teeth. The rotor iron
core defines multiple magnetic poles. A magnetic barrier
area is defined between adjacent magnetic poles in a cir-
cumferential direction, and a conductor area is located at a
radially outer side of the magnetic barrier area. The mag-
netic barrier area is provided with a hole arranged in
multiple layers in a radial direction and defining a magnetic
barrier. The conductor area is provided with multiple con-
ductors arranged at substantially equal intervals in the
circumferential direction and having substantially identical
cross-sectional shapes as each other. The following relation-
ship is satisfied: $Nc=\{2\times[Nt/(2\times Np)-1]-1\}\times Np$ where Nt is
a number of the pole teeth, Np is a number of the magnetic
poles, and Nc is a number of the conductors.

23 Claims, 5 Drawing Sheets

1

SYNCHRONOUS RELUCTANCE MOTOR

CROSS REFERENCE TO RELATED APPLICATIONS

The present application claims priority under 35 U.S.C. § 119 to Chinese Application No. 202310213183.4 filed on Mar. 7, 2023, the entire contents of which are hereby incorporated herein by reference.

BACKGROUND

Field of the Invention

The disclosure relates to a synchronous reluctance motor.

Background

Synchronous reluctance motor has begun to replace induction motors in many industries due to its advantages of high efficiency, wide speed range, and low manufacturing cost.

A synchronous reluctance motor usually includes a rotor and a stator. The rotor includes a rotor iron core. The stator has multiple pole teeth, provided at a radially outer side, opposite and spaced apart from the rotor iron core, and arranged at equal intervals in the circumferential direction. The rotor iron core defines multiple magnetic poles in the circumferential direction, and a hole arranged in multiple layers in the radial direction and defining a magnetic barrier is defined between adjacent magnetic poles in the circumferential direction.

However, unlike induction motors, synchronous reluctance motors are usually not self-starting. To address this problem, the following synchronous reluctance motor has existed in the past: the magnetic barrier structure of the rotor iron core is divided into multiple areas, and a conductor is defined by filling an area at the radially outer side with a conductive material.

In the synchronous reluctance motor described above, self-starting is possible, as in an induction motor, by providing a conductor in an area at the radially outer side of the rotor iron core.

However, in the above synchronous reluctance motor, the starting capability may sometimes be insufficient due to the shape of the area at the radially outer side of the rotor iron core filled with the conductive material. Moreover, since there are many slices defined by dividing the magnetic barrier structure of the rotor iron core, the d-axis and q-axis inductance difference decreases, resulting in poor motor efficiency.

SUMMARY

In view of the above problems, the disclosure provides a synchronous reluctance motor, which helps to increase the starting capability of the motor and enhance the efficiency of the motor.

In order to achieve the above objectives, the disclosure provides a synchronous reluctance motor, including a rotor and a stator. The rotor includes a rotor iron core. The stator has multiple pole teeth, provided at a radially outer side, opposite and spaced apart from the rotor iron core, and arranged at substantially equal intervals in a circumferential direction. The rotor iron core defines multiple magnetic poles arranged in the circumferential direction, a magnetic barrier area is defined between adjacent magnetic poles in the circumferential direction, and a conductor area is located at the radially outer side of the magnetic barrier area. The magnetic barrier area is provided with a hole arranged in multiple layers in a radial direction and defining a magnetic barrier, and the conductor area is provided with conductors. The conductors are arranged at substantially equal intervals in the circumferential direction and have substantially identical cross-sectional shapes as each other. The following relationship is satisfied: $Nc=\{2\times[Nt/(2\times Np)-1]-1\}\times Np$, where Nt is a number of the pole teeth, Np is a number of the magnetic poles, and Nc is a number of the conductors.

According to the synchronous reluctance motor of the disclosure, in the conductor area at the radially outer side of the magnetic barrier area in the rotor iron core, the conductors are arranged at substantially equal intervals in the circumferential direction and have substantially identical cross-sectional shapes as each other. Thus, the conductors are substantially evenly distributed, which contributes to increasing the starting capability of the motor. Further, there is no need to divide the magnetic barrier area to define an excessive number of sliced areas, which helps to enhance the efficiency of the motor. In addition, the following relationship is satisfied: $Nc=\{2\times[Nt/(2\times Np)-1]-1\}\times Np$, where Nt is a number of the pole teeth, Np is a number of the magnetic poles, and Nc is a number of the conductors. Thus, torque ripples may be suppressed and losses may be reduced.

In addition, in the synchronous reluctance motor of the disclosure, the hole of each of the layers may be respectively provided with a magnet and may respectively include a pair of divided holes divided by a bridge, which is a portion of the rotor iron core and located substantially on a q-axis, and the magnet includes divided magnets provided adjacent to the q-axis in each of the divided holes.

According to the synchronous reluctance motor of the disclosure, a magnet is provided adjacent to the q-axis in the hole of each of the layers. As a result, the generation of magnetic saturation at the q-axis position may be suppressed and the efficiency of the motor may be enhanced. Moreover, since the magnet in the hole of each of the layers is divided by the bridge, which is a portion of the rotor iron core and located on the q-axis, irreversible demagnetization of the magnet is avoided and the reliability of motor operation is enhanced.

In addition, in the synchronous reluctance motor of the disclosure, when viewed along an axial direction, the conductors may have a strip or substantially a strip shape extending in the radial direction.

In addition, in the synchronous reluctance motor of the disclosure, when viewed along an axial direction, two ends of the conductors in the radial direction are semicircular in shape, respectively.

In addition, in the synchronous reluctance motor of the disclosure, when viewed along an axial direction, intermediate portions between two ends of the conductors in the radial direction have a tapered shape in which a circumferential width becomes narrower toward the inside in the radial direction.

In addition, in the synchronous reluctance motor of the disclosure, the following relationship is satisfied: $Wt\leq Dc\leq1.5Wt$, where Dc is a distance between adjacent conductors in the circumferential direction, and Wt is a circumferential width of the pole teeth.

In addition, in the synchronous reluctance motor of the disclosure, the rotor iron core has a circular hole centered on a rotation center of the rotor at a position radially inward of the magnetic barrier area, and the following relationship is satisfied: $0.35R\leq Lc\leq0.45R$, where Lc is a radial length of the conductors, and R is a radial distance between an outer circumferential surface of the rotor iron core and an inner circumferential surface of the circular hole.

In addition, in the synchronous reluctance motor of the disclosure, the following relationship is satisfied: Nb<Nt/ (4Np), where Nb is a number of the layers.

In addition, in the synchronous reluctance motor of the disclosure, when viewed along an axial direction, the hole of each of the layers respectively has a shape of arcs or straight lines.

In addition, in the synchronous reluctance motor of the disclosure, circumferential widths of end portions in the circumferential direction of the each hole of each layer are smaller than a minimum circumferential width of an intermediate portion between both end portions in the radial direction of the conductor.

In addition, in the synchronous reluctance motor of the disclosure, circumferential ends of the hole of each layer are respectively opposed to a radially inner end of one of the conductors.

In addition, in the synchronous reluctance motor of the disclosure, the rotor iron core includes iron core sheets laminated in an axial direction, and the following relationship is satisfied: D≥T, where D is a distance between ends of the hole of each of the layers in the circumferential direction and ends of the conductors at a radially inner side, and T is a thickness of the iron core sheets.

In addition, in the synchronous reluctance motor of the disclosure, the following relationship is satisfied: θ≤360/(2× Ns×Np), where θ is an angle defined by the d-axis and a line connecting the point Pt and the rotation center of the rotor under the condition that Pt being an intersection point of a tangent line at a circumferential end portion of a radially inner edge of a radially outermost hole and the outer circumferential surface of the rotor iron core, and Ns is a number of the magnetic poles.

In addition, in the synchronous reluctance motor of the disclosure, the following relationship is satisfied: Wo≤Wb≤0.5Wt, where Wb is a circumferential width of a bridge, and Wo is an opening width of a groove between adjacent pole teeth in the circumferential direction, and Wt is a circumferential width of the pole teeth.

In addition, in the synchronous reluctance motor of the disclosure, the following relationship is satisfied: θ1≥(3× 360)/Nt, and θ2≥θ1, where θ1 is an angle defined by lines which connect the rotation center of the rotor and circumferential both ends of a radially inner edge of the magnet in a radially outermost hole respectively, θ2 is an angle defined by lines which connect the rotation center of the rotor and circumferential both ends of a radially inner edge of the magnet in a radially innermost hole respectively.

The above and other elements, features, steps, characteristics and advantages of the present disclosure will become more apparent from the following detailed description of the preferred embodiments with reference to the attached drawings.

DETAILED DESCRIPTION

According to the disclosure, in the conductor area at the radially outer side of the magnetic barrier area in the rotor iron core, the conductors are arranged at substantially equal intervals in the circumferential direction and have substantially identical cross-sectional shapes as each other. Thus, the conductors are substantially evenly distributed, which contributes to increasing the starting capability of the motor. Further, there is no need to divide the magnetic barrier area to define an excessive number of sliced areas, which helps to enhance the efficiency of the motor. In addition, the following relationship is satisfied: Nc={2×[Nt/(2×Np)−1]− 1}×Np, where Nt is a number of the pole teeth, Np is a number of the magnetic poles, and Nc is a number of the conductors. Thus, torque ripples may be suppressed and losses may be reduced.

Figure 1:
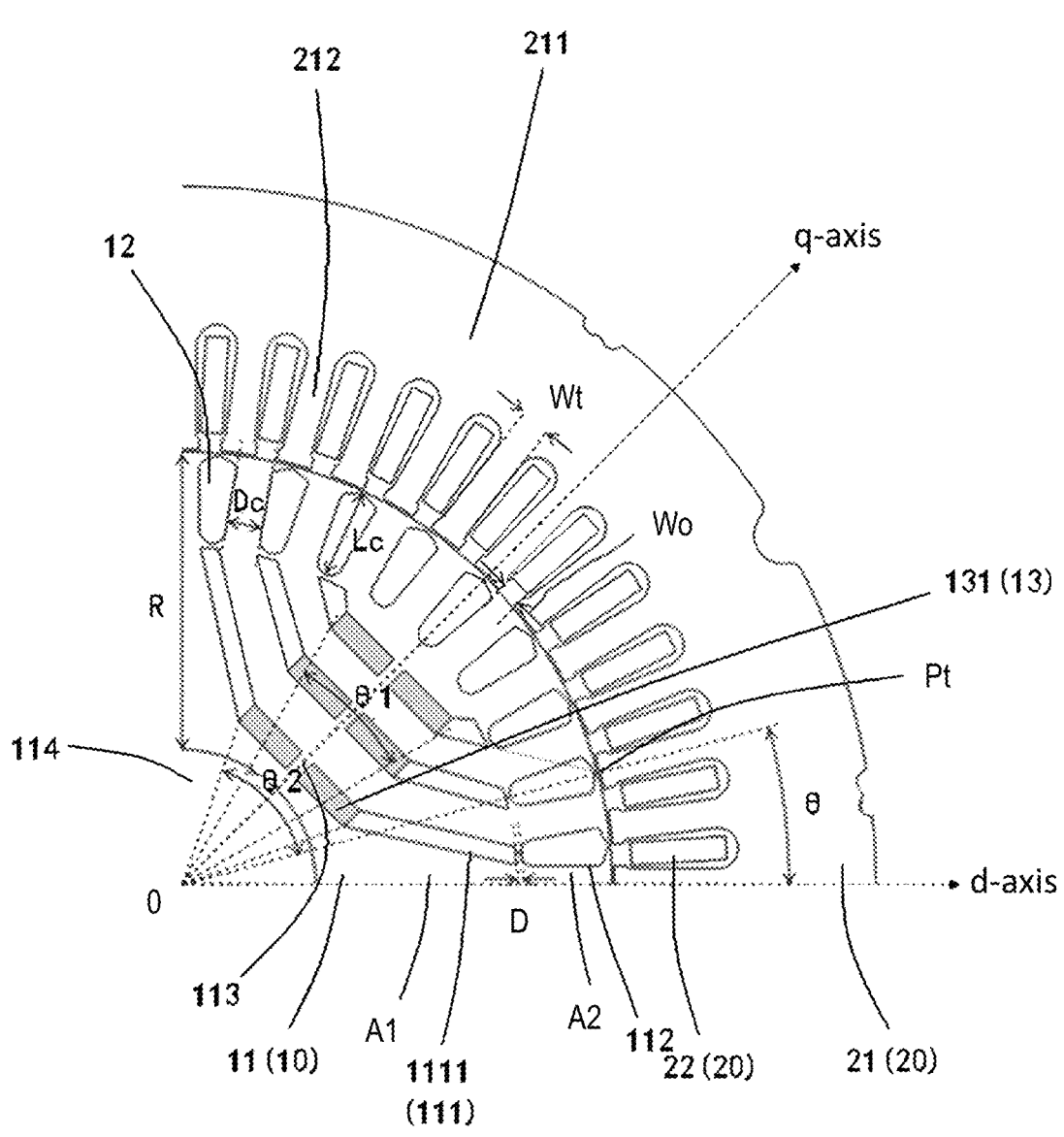
FIG. 1 is a partial cross-sectional view schematically illustrating the synchronous reluctance motor according to an exemplary embodiment of the disclosure.
Figure 2:
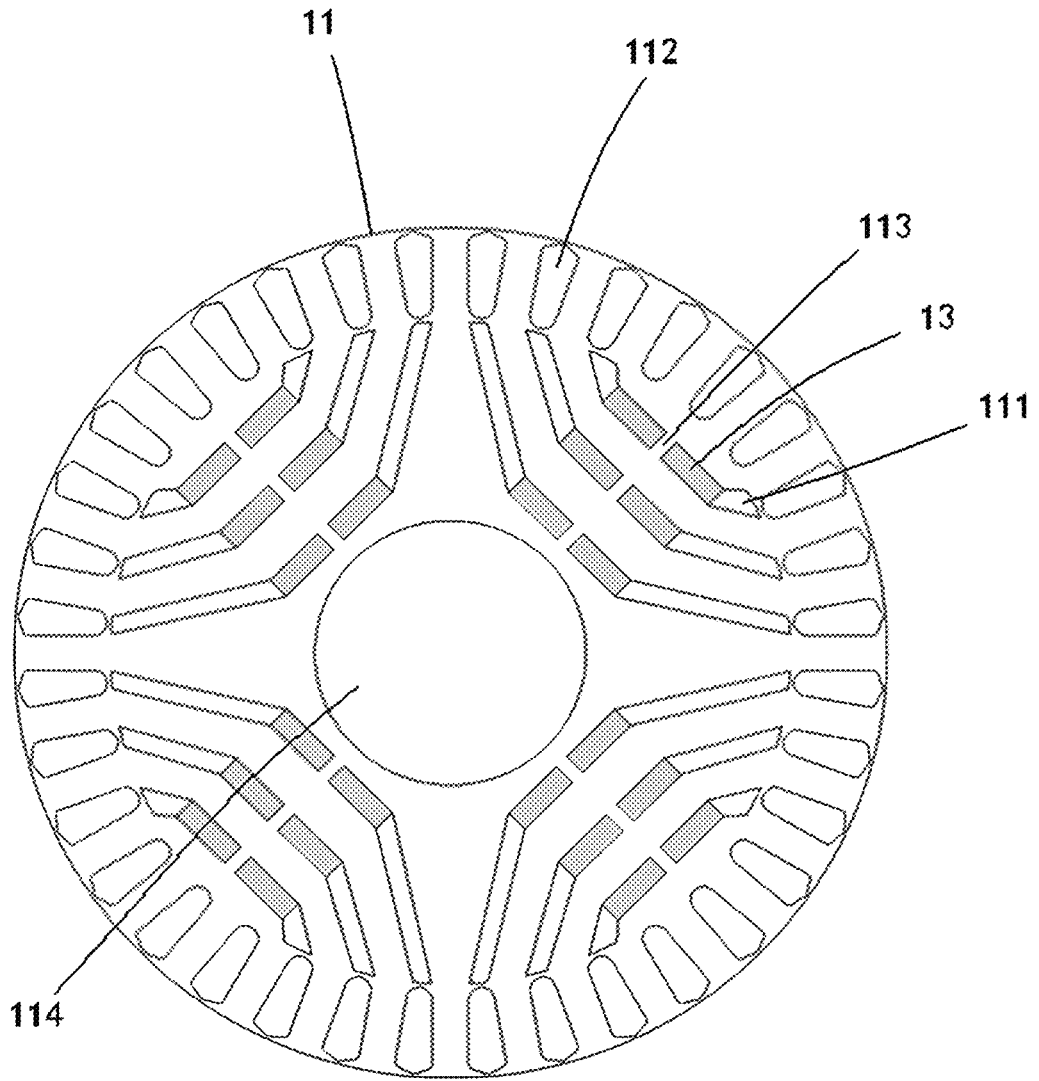
FIG. 2 is a cross-sectional view schematically illustrating the rotor in the synchronous reluctance motor according to an exemplary embodiment of the disclosure.

Next, the synchronous reluctance motor in the exemplary embodiment of the disclosure will be described with reference to FIG. 1 and FIG. 2. FIG. 1 is a partial cross-sectional view schematically illustrating the synchronous reluctance motor according to an exemplary embodiment of the disclosure. FIG. 2 is a cross-sectional view schematically illustrating the rotor in the synchronous reluctance motor according to an exemplary embodiment of the disclosure.

As shown in FIG. 1 and FIG. 2, the synchronous reluctance motor 1 includes a rotor 10 and a stator 20. The rotor 10 has a rotor iron core 11. The stator 20 has multiple pole teeth 212, provided at a radially outer side, opposite and spaced apart from the rotor iron core 11, and arranged at substantially equal intervals in a circumferential direction. The rotor iron core 11 defines multiple magnetic poles arranged in the circumferential direction, a magnetic barrier area A1 is defined between adjacent magnetic poles in the circumferential direction, and a conductor area A2 is located at the radially outer side of the magnetic barrier area A1. The magnetic barrier area A1 is provided with a hole 111 arranged in multiple layers in a radial direction and defining a magnetic barrier, and the conductor area A2 is provided with conductors 12.

In addition, as shown in FIG. 1, the conductors 12 are arranged at substantially equal intervals in the circumferential direction and have substantially identical cross-sectional shapes (shapes on the cross-sections cut in a direction perpendicular to the axial direction) as each other.

In addition, as shown in FIG. 1, the hole 111 of each of the layers is respectively provided with a magnet 13 and respectively includes a pair of divided holes 1111 divided by a bridge 113, which is a portion of the rotor iron core 11 and located on a q-axis, and the magnet 13 includes divided magnets 131 provided adjacent to the q-axis in each of the divided holes 1111.

As shown in FIG. 1 and FIG. 2, the rotor 10 includes a rotor iron core 11, and the rotor iron core 11 includes iron core sheets laminated in an axial direction.

In addition, as shown in FIG. 1 and FIG. 2, the rotor iron core 11 is defined with a magnetic barrier area A1 and a conductor area A2 closer to the radially outer side comparing to the magnetic barrier area A1, the magnetic barrier area A1 is provided with the hole 111 defining the magnetic barrier, and the conductor area A2 is provided with the hole 112 for defining the conductors 12. Specifically, in the magnetic barrier area A1, the holes 111 penetrate the rotor iron core 11 in the axial direction, and when viewed along the axial direction, the hole 111 of each of the layers respectively has a shape protruding toward the radially inner side and is defined by straight lines (in the example shown in the figure, the hole 111 of each of the layers is overall defined by a first straight line segment substantially perpendicular to the q-axis and a second straight line segment extending from two ends of the straight line segment toward two ends in the circumferential direction and the radially outer side, and is symmetric on the q-axis). Moreover, in the conductor area A2, the holes 112 penetrate the rotor iron core 11 in the axial direction, and when viewed along the axial direction, it may have a strip or substantially strip shape extending in the radial direction.

In addition, the rotor iron core 11 may have a circular hole 114 centered on a rotation center O of the rotor 10 at a position radially inward of the magnetic barrier area A1. Specifically, the circular hole 114 penetrates the rotor iron core 11 in the axial direction and allows a shaft that is not shown in the figure to be inserted.

In addition, as shown in FIG. 1 and FIG. 2, in each of the layers, the magnet 13 is provided in the straight line segment portion of the hole 111 that is substantially perpendicular to the q-axis and has a shape substantially identical to the straight line segment portion of the hole 111 that is substantially perpendicular to the q-axis (in the example shown in the figure, when viewed along the axial direction, the magnet 13 has a rectangular or substantially rectangular shape as a whole, the lengths of the straight line segment portions of the holes 111 in multiple layers perpendicular to the q-axis are substantially identical to each other, and the lengths of the magnets 13 in the holes 111 in multiple layers are also substantially identical to each other).

In addition, as shown in FIG. 1 and FIG. 2, the conductors 12 are filled into the hole 112, for example, by casting, and are defined by aluminum or copper, and when viewed along the axial direction, the cross-sectional shape of the conductor 12 is substantially identical to the cross-sectional shape of the hole 112. Specifically, when viewed along the axial direction, the conductor 12 has a strip or substantially strip shape extending in the radial direction. In addition, when viewed along the axial direction, two ends of the conductors 12 in the radial direction are semicircular shapes, respectively, and intermediate portions between two ends of the conductors 12 in the radial direction have a tapered shape in which a circumferential width becomes narrower toward the inside in the radial direction. Moreover, when viewed along the axial direction, opposite sides of the intermediate portions of two adjacent conductors 12 in the circumferential direction are parallel to each other.

As shown in FIG. 1, the stator 20 includes a stator iron core 21 and a coil 22 wound around the stator iron core 21.

In addition, as shown in FIG. 1, the stator iron core 21 includes an iron core back 211 and pole teeth 212, the iron core back 211 has a ring or substantially ring shape, the pole teeth 212 extend from the iron core back 211 toward the radially inner side and are arranged at substantially equal intervals in the circumferential direction, and a groove opening toward the radially inner side is defined between adjacent pole teeth 212 in the circumferential direction. Moreover, when viewed along the axial direction, the pole teeth 212 has a T-shape or substantially T-shape as a whole, including pole teeth main bodies and pole teeth front ends (the ends at the radially inner side), the pole teeth main bodies of two adjacent pole teeth 212 in the circumferential direction face each other, and the circumferential width of the pole teeth front ends is greater than the circumferential width of the pole teeth main bodies.

In addition, as shown in FIG. 1, the coil 22 is wound around the pole teeth 212 and inserted into the groove defined between adjacent pole teeth 212 in the circumferential direction.

In this exemplary embodiment, the following relationship is satisfied: $Nc=\{2\times[Nt/(2\times Np)-1]-1\}\times Np$, where Nt is a number of the pole teeth 212, Np is a number of the magnetic poles of the rotor iron core 11, and Nc is a number of the conductors 12.

In addition, as shown in FIG. 1, the following relationship is satisfied: $Wt\leq Dc\leq 1.5Wt$, where Dc is a distance between adjacent conductors 12 in the circumferential direction, and Wt is a circumferential width (here, the circumferential width of the pole teeth main body) of the pole teeth. Moreover, the following relationship is satisfied: $0.35R\leq Lc\leq 0.45R$, where Lc is a radial length of the conductors 12, and R is a radial distance between an outer circumferential surface of the rotor iron core 11 and an inner circumferential surface of the circular hole 114.

In addition, as shown in FIG. 1, the following relationship is satisfied: $Nb<Nt/(4Np)$, where Nb is a number of the layers of the hole 111. Moreover, circumferential widths of end portions in the circumferential direction of the each hole 111 of each layer are smaller than a minimum circumferential width of an intermediate portion between both end portions in the radial direction of the conductor. Further, circumferential ends of the hole 111 of each layer are respectively opposed to a radially inner end of one of the conductors 12. In addition, the following relationship is satisfied: $D\geq T$, where D is a distance between ends of the hole 111 of each of the layers in the circumferential direction and ends of the conductors 12 at a radially inner side, and T is a thickness of the iron core sheets comprising the rotor iron core 11.

In addition, as shown in FIG. 1, the following relationship is satisfied: $\theta\leq 360/(2\times Ns\times Np)$, where $\theta$ is an angle defined by the d-axis and a line connecting the point Pt and the rotation center of the rotor under the condition that Pt being an intersection point of a tangent line (in the example shown in the figure, consistent with an extension line of the edge of the second straight line segment at the radially inner side) at a circumferential end portion of a radially inner edge of a radially outermost hole and the outer circumferential surface of the rotor iron core 11, and Ns is a number of the magnetic poles. Moreover, the following relationship is satisfied: $\theta 1\geq(3\times 360)/Nt$, and $\theta 2\geq\theta 1$, where $\theta 1$ is an angle defined by lines which connect the rotation center O of the rotor 10 and circumferential both ends of a radially inner edge of the magnet 13 in a radially outermost hole 111 respectively, $\theta 2$ is an angle defined by lines which connect the rotation center O of the rotor 10 and circumferential both ends of a radially inner edge of the magnet 13 in a radially innermost hole 111 respectively.

In addition, as shown in FIG. 1, the following relationship is satisfied: $Wo\leq Wb\leq 0.5Wt$, where Wb is a circumferential width of abridge 113, and Wo is an opening width of a groove between adjacent pole teeth 212 in the circumferential direction, and Wt is a circumferential width of the pole teeth 212.

According to the synchronous reluctance motor 1 of this exemplary embodiment, in the conductor area A2 at the radially outer side of the magnetic barrier area A1 in the rotor iron core 11, the conductors 12 are arranged at substantially equal intervals in the circumferential direction and have substantially identical cross-sectional shapes as each other. Thus, the conductors 12 are substantially evenly distributed, which contributes to increasing the starting capability of the motor. Further, there is no need to divide the magnetic barrier area A1 to define an excessive number of sliced areas, which helps to enhance the efficiency of the motor. In addition, the following relationship is satisfied: Nc={2×[Nt/(2×Np)−1]−1}×Np, where Nt is a number of the pole teeth 212, Np is a number of the magnetic poles, and Nc is a number of the conductors 12. Thus, torque ripples may be suppressed and losses may be reduced.

In addition, according to the synchronous reluctance motor 1 of this exemplary embodiment, a magnet 13 is provided adjacent to the q-axis in the hole 111 of each of the layers. As a result, the generation of magnetic saturation at the q-axis position may be suppressed and the efficiency of the motor may be enhanced. Moreover, since the magnet 13 in the hole 111 of each of the layers is divided by the bridge 113, which is a portion of the rotor iron core 11 and located on the q-axis, irreversible demagnetization of the magnet 13 is avoided and the reliability of motor operation is enhanced.

The disclosure is exemplarily described above with reference to the drawings, and it is clear that specific implementations of the disclosure are not limited by the above exemplary embodiment.

Figure 3:
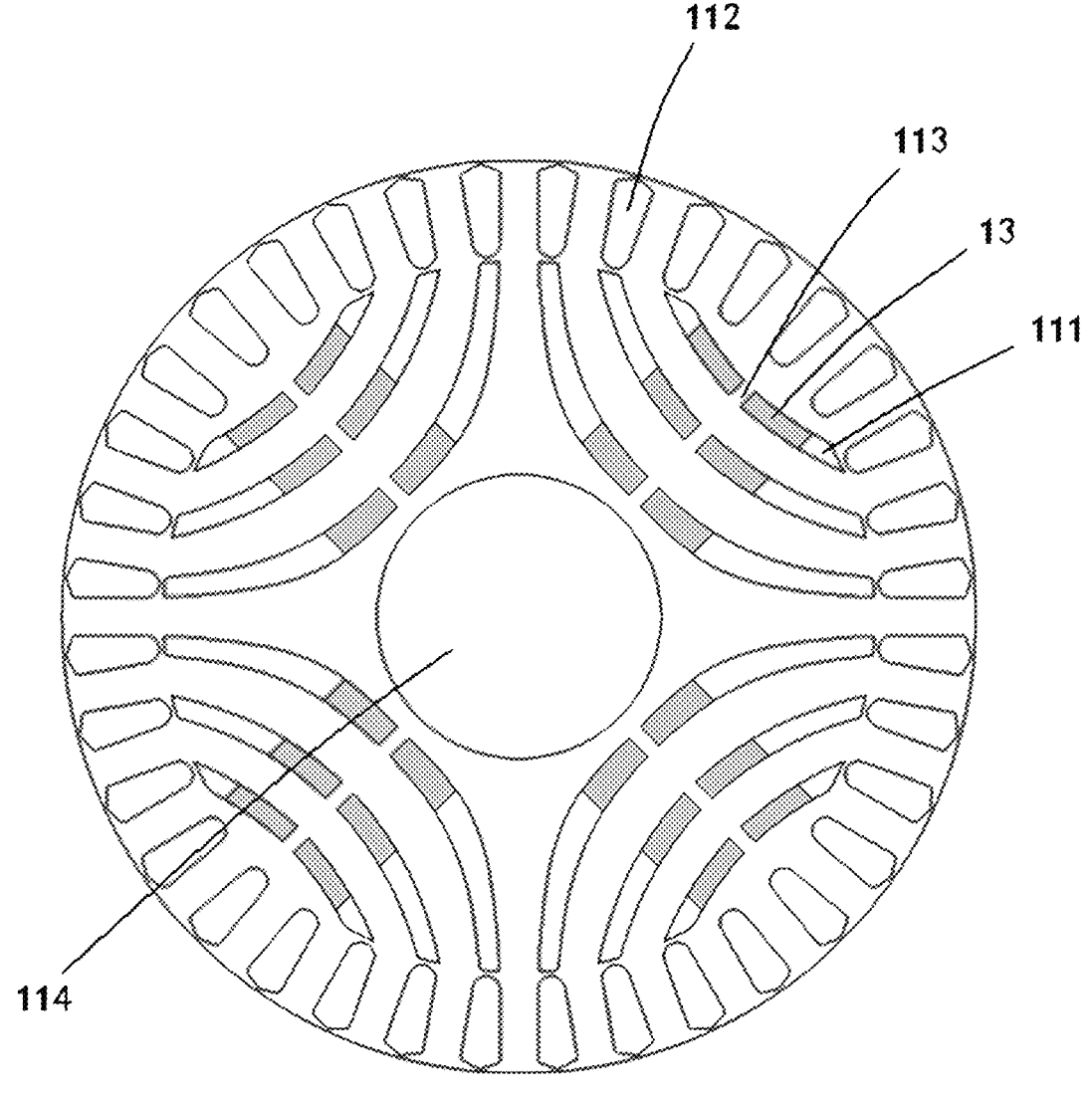
FIG. 3 is a cross-sectional view schematically illustrating the rotor in the synchronous reluctance motor according to a modification of the disclosure.

For example, in the above exemplary embodiment, the hole 111 of each of the layers has a shape defined by straight lines, but it is not limited thereto. As shown in FIG. 3, the hole 111 of each of the layers may also have a shape of arcs.

Figure 4:
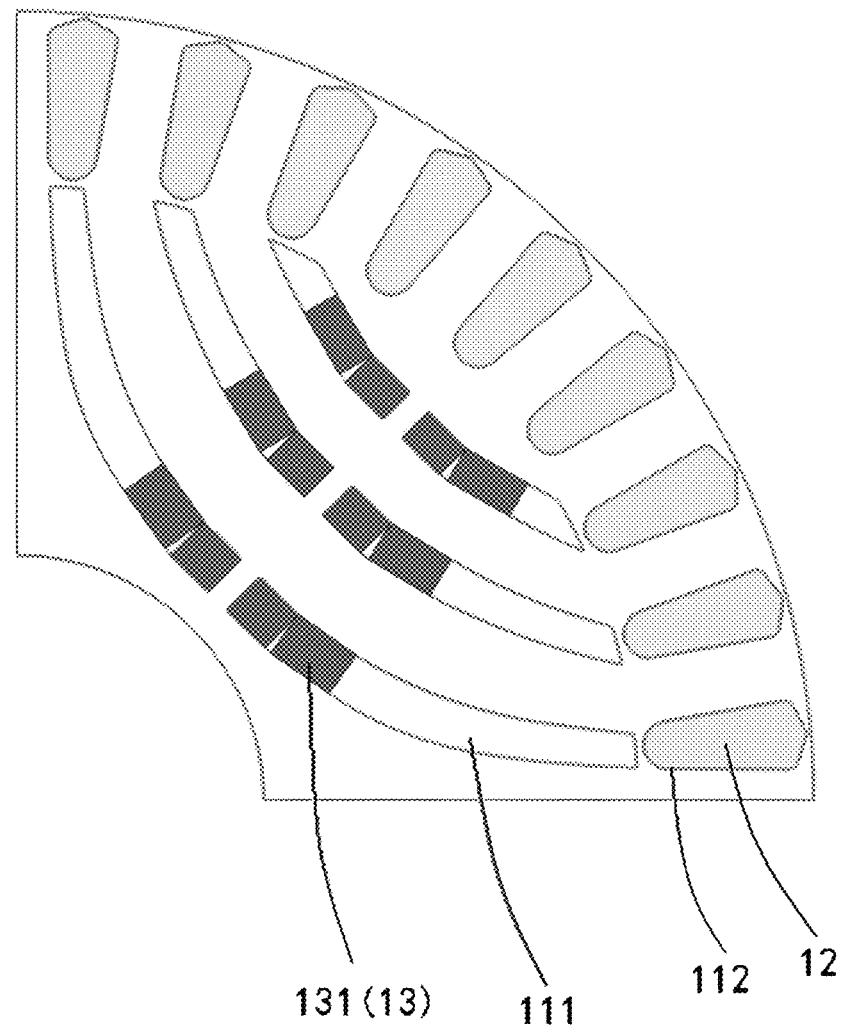
FIG. 4 is a partial cross-sectional view schematically illustrating the rotor in the synchronous reluctance motor according to another modification of the disclosure.

In addition, in the above exemplary embodiment, two divided magnets 131 may be provided in each of the divided holes 1111, as shown in FIG. 4, or three or more divided magnets 131 may be provided.

In addition, in the above exemplary embodiment, the hole 111 of each of the layers is respectively provided with a magnet 13 and respectively includes a pair of divided holes 1111 divided by a bridge 113, which is a portion of the rotor iron core 11 and located on a q-axis, but it is not limited thereto, and the magnet 13 may not be provided and the hole 111 of each of the layers may also be located in a continuous shape.

Figure 5:
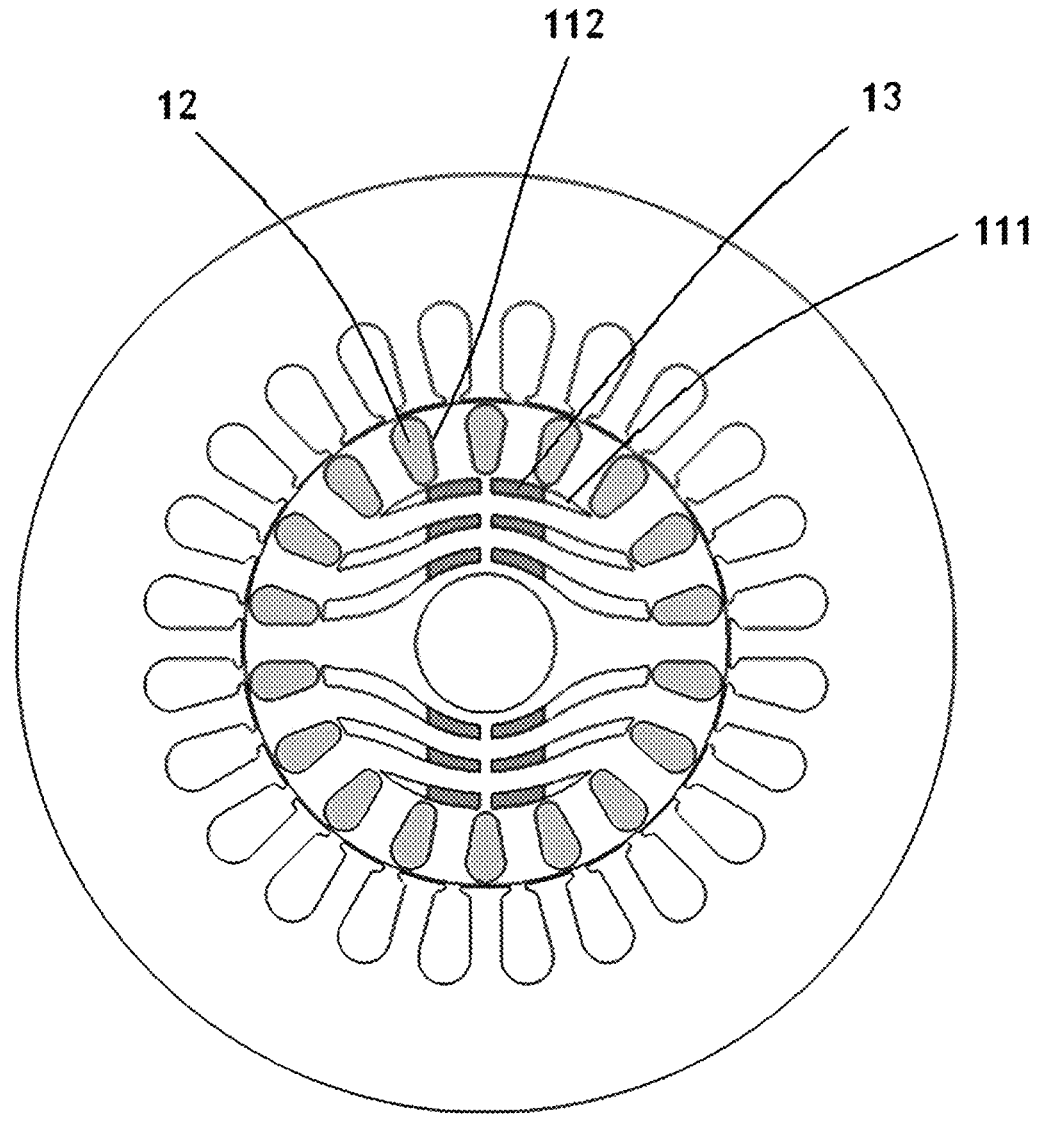
FIG. 5 is a partial cross-sectional view schematically illustrating the synchronous reluctance motor according to yet another modification of the disclosure.

In addition, in the above exemplary embodiment, in each of the divided holes 1111, the hole 111 of each of the layers respectively have a shape protruding toward the radially inner side, but it is not limited thereto. As shown in FIG. 5, the hole 111 of each of the layers may also respectively have a shape protruding toward the radially outer side.

In addition, in the above exemplary embodiment, the number of poles of the rotor 10 need only be a plurality, for example it may be four as shown in FIG. 2, or two as shown in FIG. 5, or some other number.

In addition, in the above exemplary embodiment, the number of the layers of the hole 111 is not limited to three, but may also be two or more than four.

In addition, in the above exemplary embodiment, two ends of the conductors 12 in the radial direction are semicircular shapes, respectively, and intermediate portions between two ends of the conductors 12 in the radial direction have a tapered shape in which a circumferential width becomes narrower toward the inside in the radial direction, but it is not limited thereto, and the shape of the two ends and the intermediate portions of the conductors 12 may be changed according to needs.

In addition, in the above exemplary embodiment, when viewed along the axial direction, the conductor 12 may have a strip or substantially strip shape extending in the radial direction, but it is not limited thereto, and when viewed along the axial direction, the conductors 12 may also have other shapes such as round.

In addition, in the above exemplary embodiment, the conductors 12 are filled into the hole 112 by casting, etc., but it is not limited thereto, and the conductors may also be defined by threading a wire inside the hole 112 of the rotor iron core 11.

It should be understood that within the scope of the disclosure, the various portions in the exemplary embodiment may be freely combined, or the various portions in the exemplary embodiment may be appropriately deformed or omitted.

What is claimed is:

1. A synchronous reluctance motor, comprising a rotor and a stator, wherein the rotor comprises a rotor iron core, the stator has a plurality of pole teeth, provided at a radially outer side, opposite and spaced apart from the rotor iron core, and arranged at substantially equal intervals in a circumferential direction, the rotor iron core defines a plurality of magnetic poles arranged in the circumferential direction, a magnetic barrier area is defined between adjacent magnetic poles in the circumferential direction, and a conductor area is located at the radially outer side of the magnetic barrier area, the magnetic barrier area is provided with a hole arranged in a plurality of layers in a radial direction and defining a magnetic barrier, and the conductor area is provided with conductors, wherein:

a plurality of the conductors are arranged at substantially equal intervals in the circumferential direction and have substantially identical cross-sectional shapes as each other; and the following relationship is satisfied:

$$Nc = \left\{ 2 \times \left[ Nt/(2 \times Np) - 1 \right] - 1 \right\} \times Np,$$

where Nt is a number of the pole teeth, Np is a number of the magnetic poles, and Nc is a number of the conductors, wherein the hole of each of the layers is respectively provided with a magnet and respectively comprises a pair of divided holes divided by a bridge, which is a portion of the rotor iron core and located substantially on a q-axis, and the magnet comprises divided magnets provided adjacent to the q-axis in each of the divided holes.

2. The synchronous reluctance motor according to claim 1, wherein when viewed along an axial direction, the conductors have a strip shape extending in the radial direction, or when viewed along the axial direction, two ends of the conductors in the radial direction are semicircular shapes, respectively, or when viewed along the axial direction, intermediate portions between the two ends of the conductors in the radial direction have a tapered shape in which a circumferential width becomes narrower toward the inside in the radial direction.

3. The synchronous reluctance motor according to claim 1, wherein
the following relationship is satisfied:

$$Wt \leq Dc \leq 1.5Wt,$$

where Dc is a distance between adjacent conductors in the circumferential direction, and Wt is a circumferential width of the pole teeth.

4. The synchronous reluctance motor according to claim 1, wherein
the rotor iron core has a circular hole centered on a rotation center of the rotor at a position radially inward of the magnetic barrier area, and
the following relationship is satisfied:

$$0.35R \leq Lc \leq 0.45R,$$

where Lc is a radial length of the conductors, and R is a radial distance between an outer circumferential surface of the rotor iron core and an inner circumferential surface of the circular hole.

5. The synchronous reluctance motor according to claim 1, wherein
the following relationship is satisfied:

$$Nb < Nt/(4Np),$$

where Nb is a number of the layers.

6. The synchronous reluctance motor according to claim 1, wherein
when viewed along an axial direction, the hole of each of the layers respectively has a shape of arcs or straight lines.

7. The synchronous reluctance motor according to claim 1, wherein
circumferential widths of end portions in the circumferential direction of the each hole of each layer are smaller than a minimum circumferential width of an intermediate portion between both end portions in the radial direction of the conductor.

8. The synchronous reluctance motor according to claim 1, wherein
circumferential ends of the hole of each layer are respectively opposed to a radially inner end of one of the conductors.

9. The synchronous reluctance motor according to claim 8, wherein
the rotor iron core comprises iron core sheets laminated in an axial direction; and
the following relationship is satisfied:

$$D \geq T,$$

where D is a distance between ends of the hole of each of the layers in the circumferential direction and ends of the conductors at a radially inner side, and T is a thickness of the iron core sheets.

10. The synchronous reluctance motor according to claim 1, wherein
the following relationship is satisfied:

$$\theta \leq 360/(2 \times Ns \times Np),$$

where $\theta$ is an angle defined by the d-axis and a line connecting the point Pt and the rotation center of the rotor under the condition that Pt being an intersection point of a tangent line at a circumferential end portion of a radially inner edge of a radially outermost hole and the outer circumferential surface of the rotor iron core, and Ns is a number of the magnetic poles.

11. The synchronous reluctance motor according to claim 1, wherein
the following relationship is satisfied:

$$\theta1 \geq (3 \times 360)/Nt, \text{ and } \theta2 \geq \theta1$$

where Wb is a circumferential width of the bridge, and Wo is an opening width of a groove between adjacent pole teeth in the circumferential direction, and Wt is a circumferential width of the pole teeth.

12. The synchronous reluctance motor according to claim 1, wherein
the following relationship is satisfied:

$$Wo \leq Wb \leq 0.5Wt$$

where $\theta1$ is an angle defined by lines which connect the rotation center of the rotor and circumferential both ends of a radially inner edge of the magnet in a radially outermost hole respectively, $\theta2$ is an angle defined by lines which connect the rotation center of the rotor and circumferential both ends of a radially inner edge of the magnet in a radially innermost hole respectively.

13. A synchronous reluctance motor, comprising a rotor and a stator, wherein
the rotor comprises a rotor iron core,
the stator has a plurality of pole teeth, provided at a radially outer side, opposite and spaced apart from the rotor iron core, and arranged at substantially equal intervals in a circumferential direction,
the rotor iron core defines a plurality of magnetic poles arranged in the circumferential direction,
a magnetic barrier area is defined between adjacent magnetic poles in the circumferential direction, and
a conductor area is located at the radially outer side of the magnetic barrier area,
the magnetic barrier area is provided with a hole arranged in a plurality of layers in a radial direction and defining a magnetic barrier, and
the conductor area is provided with conductors, wherein:
a plurality of the conductors are arranged at substantially equal intervals in the circumferential direction and have substantially identical cross-sectional shapes as each other; and
the following relationship is satisfied:

$$Nc = \left\{ 2 \times \left[ Nt/(2 \times Np) - 1 \right] - 1 \right\} \times Np,$$

where Nt is a number of the pole teeth, Np is a number of the magnetic poles, and Nc is a number of the conductors, wherein circumferential ends of the hole of each layer are respectively opposed to a radially inner end of one of the conductors.

14. The synchronous reluctance motor according to claim 13, wherein when viewed along an axial direction, the conductors have a strip shape extending in the radial direction, or when viewed along the axial direction, two ends of the conductors in the radial direction are semicircular shapes, respectively, or when viewed along the axial direction, intermediate portions between the two ends of the conductors in the radial direction have a tapered shape in which a circumferential width becomes narrower toward the inside in the radial direction.

15. The synchronous reluctance motor according to claim 13, wherein the following relationship is satisfied:

$$Wt \le Dc \le 1.5Wt,$$

where Dc is a distance between adjacent conductors in the circumferential direction, and Wt is a circumferential width of the pole teeth.

16. The synchronous reluctance motor according to claim 13, wherein the rotor iron core has a circular hole centered on a rotation center of the rotor at a position radially inward of the magnetic barrier area, and the following relationship is satisfied:

$$0.35R \le Lc \le 0.45R,$$

where Lc is a radial length of the conductors, and R is a radial distance between an outer circumferential surface of the rotor iron core and an inner circumferential surface of the circular hole.

17. The synchronous reluctance motor according to claim 13, wherein the following relationship is satisfied:

$$Nb < Nt/(4Np),$$

where Nb is a number of the layers.

18. The synchronous reluctance motor according to claim 13, wherein when viewed along an axial direction, the hole of each of the layers respectively has a shape of arcs or straight lines.

19. The synchronous reluctance motor according to claim 13, wherein circumferential widths of end portions in the circumferential direction of the each hole of each layer are smaller than a minimum circumferential width of an intermediate portion between both end portions in the radial direction of the conductor.

20. The synchronous reluctance motor according to claim 13, wherein the rotor iron core comprises iron core sheets laminated in an axial direction; and the following relationship is satisfied:

$$D \ge T,$$

where D is a distance between ends of the hole of each of the layers in the circumferential direction and ends of the conductors at a radially inner side, and T is a thickness of the iron core sheets.

21. The synchronous reluctance motor according to claim 13, wherein the following relationship is satisfied:

$$\theta \le 360/(2 \times Ns \times Np),$$

where $\theta$ is an angle defined by the d-axis and a line connecting the point Pt and the rotation center of the rotor under the condition that Pt being an intersection point of a tangent line at a circumferential end portion of a radially inner edge of a radially outermost hole and the outer circumferential surface of the rotor iron core, and Ns is a number of the magnetic poles.

22. The synchronous reluctance motor according to claim 13, wherein the following relationship is satisfied:

$$Wo \le Wb \le 0.5Wt$$

where Wb is a circumferential width of a bridge, and Wo is an opening width of a groove between adjacent pole teeth in the circumferential direction, and Wt is a circumferential width of the pole teeth.

23. The synchronous reluctance motor according to claim 13, wherein the hole of each of the layers is respectively provided with a magnet and respectively comprises a pair of divided holes divided by a bridge, which is a portion of the rotor iron core and located substantially on a q-axis, the magnet comprises divided magnets provided adjacent to the q-axis in each of the divided holes, and the following relationship is satisfied:

$$\theta 1 \ge (3 \times 360)/Nt, \text{ and } \theta 2 \ge \theta 1$$

where $\theta 1$ is an angle defined by lines which connect the rotation center of the rotor and circumferential both ends of a radially inner edge of the magnet in a radially outermost hole respectively, $\theta 2$ is an angle defined by lines which connect the rotation center of the rotor and circumferential both ends of a radially inner edge of the magnet in a radially innermost hole respectively.

* * * * *